US009131025B1

(12) United States Patent
Evans et al.

(10) Patent No.: US 9,131,025 B1
(45) Date of Patent: *Sep. 8, 2015

(54) ADDING LATENCY TO IMPROVE PERCEIVED PERFORMANCE

(71) Applicant: Amazon Technologies, Inc., Reno, NV (US)

(72) Inventors: Ethan Z. Evans, Snoqualmie, WA (US); Jason Jenks, Lynnwood, WA (US); Adam J. Overton, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/099,819

(22) Filed: Dec. 6, 2013

Related U.S. Application Data

(63) Continuation of application No. 12/916,111, filed on Oct. 29, 2010, now Pat. No. 8,606,958.

(51) Int. Cl.
*G06F 15/16* (2006.01)
*H04L 29/06* (2006.01)

(52) U.S. Cl.
CPC ...................... *H04L 67/42* (2013.01)

(58) Field of Classification Search
USPC .......................................... 709/203, 232, 233
See application file for complete search history.

(56) References Cited

U.S. PATENT DOCUMENTS

| | | | |
|---|---|---|---|
| 6,061,722 A * | 5/2000 | Lipa et al. ................. 709/224 |
| 6,466,817 B1 * | 10/2002 | Kaula et al. ................ 600/546 |
| 7,849,491 B2 | 12/2010 | Perlman |
| 8,150,675 B1 * | 4/2012 | Ortmanns et al. ............. 703/23 |
| 8,606,958 B1 | 12/2013 | Evans et al. |
| 2003/0045808 A1 * | 3/2003 | Kaula et al. ................ 600/546 |
| 2006/0294221 A1 * | 12/2006 | Graupner et al. ............ 709/224 |
| 2007/0270135 A1 * | 11/2007 | Gaschler .................. 455/414.3 |
| 2009/0118019 A1 | 5/2009 | Perlman et al. |
| 2010/0197405 A1 * | 8/2010 | Douceur et al. .............. 463/42 |
| 2011/0071978 A1 * | 3/2011 | Lottridge et al. .............. 706/54 |
| 2011/0096675 A1 * | 4/2011 | Li et al. .................... 370/252 |
| 2012/0028712 A1 | 2/2012 | Zuili |

OTHER PUBLICATIONS

Persistent Worlds Whitepaper, IGDA Online Games SIG, 2004, pp. 82.
World of Warcraft, Blizzard Entertainment, game manual, 2004, pp. 114.

* cited by examiner

*Primary Examiner* — Liangche A Wang
(74) *Attorney, Agent, or Firm* — Knobbe, Martens, Olson & Bear, LLP

(57) ABSTRACT

Techniques described herein provide a system and methods for adding latency to improve the perceived performance of computing devices. For instance, the techniques may calculate transaction latencies for a given session based on the time between sending requests for content and receiving the requested content. The calculated latencies may be aggregated or averaged in such a way that a specific latency may be selected for improving the perceived performance. A client device may then render subsequent content based on the selected latency or a server may serve subsequent content based on the selected latency. This artificial addition of latency may enhance the user experience by creating a more consistent environment.

24 Claims, 7 Drawing Sheets

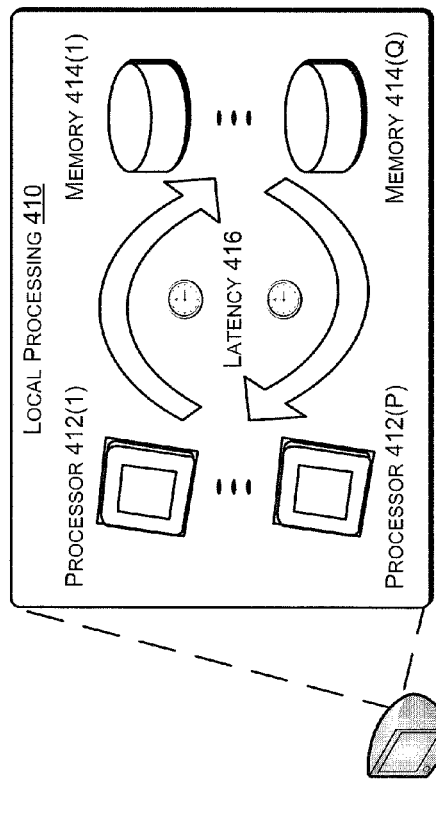
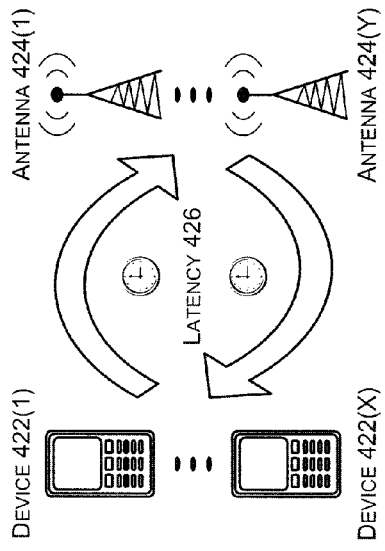
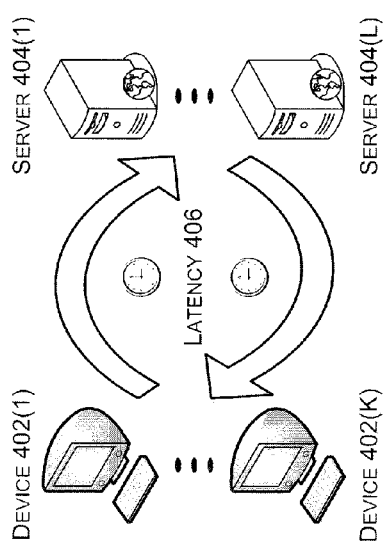
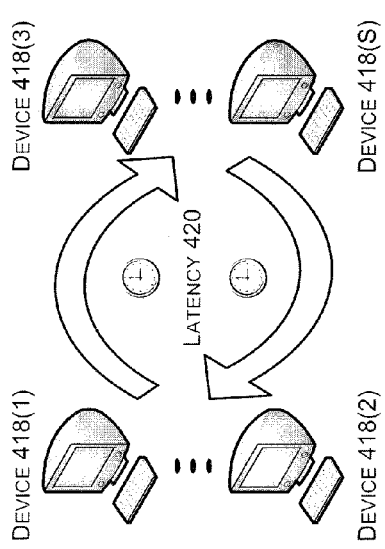
Fig. 4A
Fig. 4B
Fig. 4C
Fig. 4D

ADDING LATENCY TO IMPROVE PERCEIVED PERFORMANCE

CROSS-REFERENCES TO RELATED APPLICATIONS

This application is a continuation of U.S. patent application Ser. No. 12/916,111, entitled ADDING LATENCY TO IMPROVE PERCEIVED PERFORMANCE, and filed Oct. 29, 2010, the entirety of which is incorporated herein by reference. This application is related to U.S. patent application Ser. No. 12/885,296, entitled ACCOMODATING LATENCY IN A SERVER-BASED APPLICATION, and filed Sep. 17, 2010, the entirety of which is incorporated herein by reference in its entirety.

BACKGROUND

In the world of computers and the Internet, many different types of devices transmit and receive digital content both internally as well as over wired and wireless communication networks. For instance, a computer processor on a local device may read data from and/or write data to a memory storage location that resides locally on the device. The processor may also read from and/or write to networked storage locations that are located remotely on other devices. That is, many computing devices often interconnect via wired and/or wireless networks for transmitting digital content from one device to another, sometimes over vast distances.

On a local device, a processor may retrieve an instruction from a local memory location, and may subsequently write some data to a different location in the local memory. These processes may occur in response to a user request or other action. For instance, when a user selects an icon on a screen of a computing device, the processor may execute many read and/or write instructions involving interaction with the memory. Each of these actions, however, may involve data traveling along a physical wire to and from the processor. Although it may often seem immediate to the user (as the user's selection is highlighted in seemingly no time), these data transmissions are not instantaneous. For example, some time may pass during the execution of instructions. In general, this passing of time between a request and receipt of an indication that the request has been executed is called latency.

Further, it is often the case that latency may be variable for any given session. For instance, a user may experience variations in latency, even for identical scenarios, during a single time-frame or on-line session. That is, a user may experience changes in latency from one instance to the next. However, this can be rather frustrating and can cause a poor user experience. Unfortunately, latencies of the current systems may be too unpredictable and variable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIGS. 4A-4D illustrate four different embodiments for utilizing the latency injection described in FIGS. 1 and 2. FIG. 4A is an example implementation in a client/server environment, FIG. 4B is an example implementation for accessing local memory, FIG. 4C is an example implementation in a peer-to-peer environment and FIG. 4D is an example implementation in an Internet Protocol (IP) telephony environment.

DETAILED DESCRIPTION OF THE PREFERRED EMBODIMENT

Overview

Figure 1:
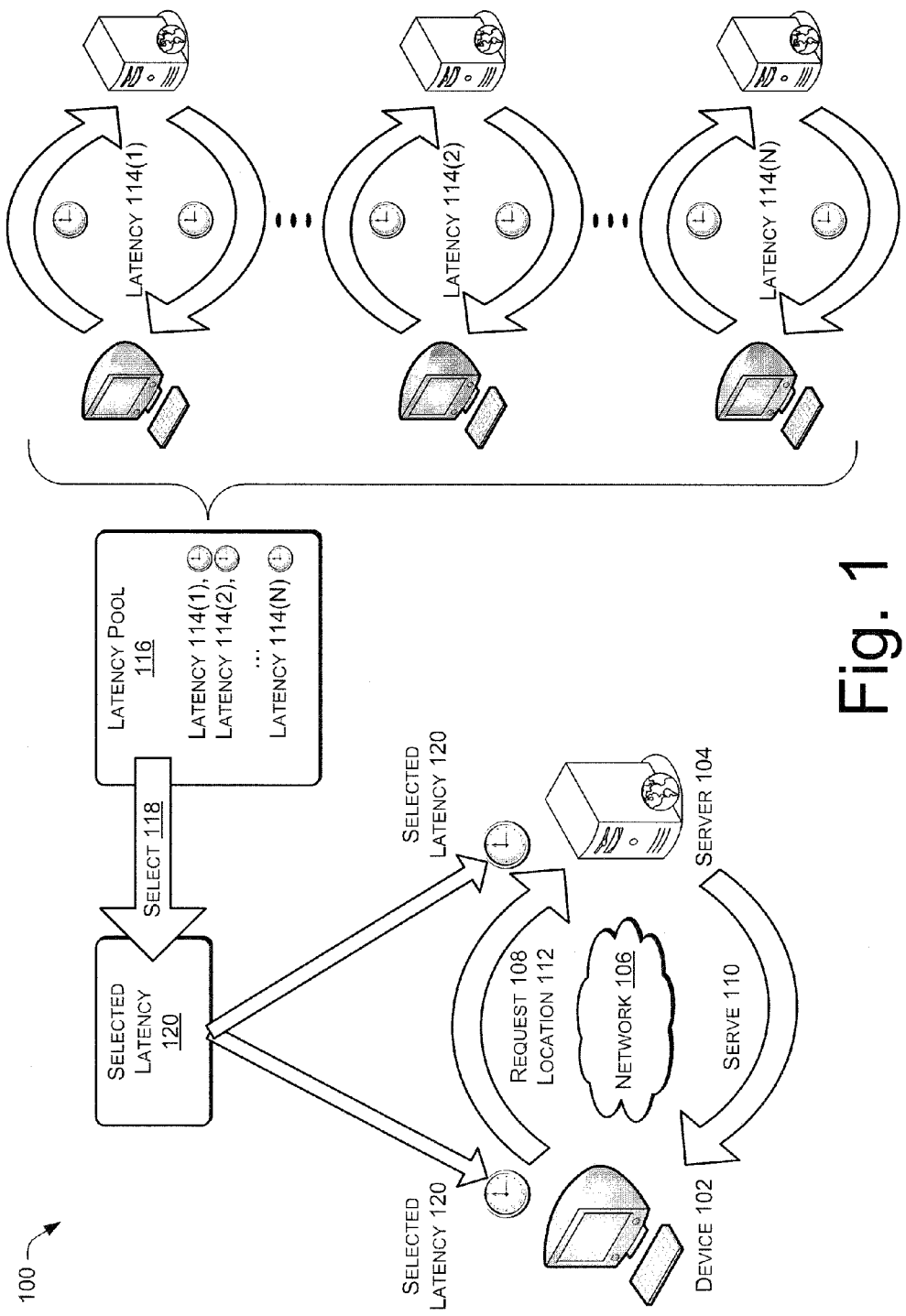
FIG. 1 illustrates an example architecture that includes a device and a server connected via a network, where a selected latency may be injected into a transaction to improve the perceived performance. The selected latency may be determined after several latency times have been calculated for similar transactions or during the same session.

This disclosure is directed, in part, to techniques for calculating and selecting latencies from a multitude of different scenarios to smooth out variable latencies found in electronic devices. This disclosure is also related to injecting selected latencies into scenarios involving multiple different types of digital devices. By doing so, the techniques allow for the perceived improvement of a device's performance with or without actually reducing latency. For instance, a device may calculate and aggregate transaction latencies that occur with another device, or within the device itself, such that it may inject a certain amount of latency into subsequent related transactions. For instance, the device may inject latency equal to some average latency of the previous transactions, a latency that is near the highest calculated latency, or the like. In this way, device transactions may achieve a consistent latency for improving the perceived performance and, thus, a user's experience.

As such, when a user operates a device implementing the techniques described herein, regardless of the specific environment, the user may be unaware of any latency variance found between one digital transaction and the next. Further, by injecting higher than normal latencies to create a more consistent user experience, the devices described may gradually increase noticed latency over time and/or may level the playing field for on-line gaming. Service providers may then create optimal latencies for different days, or times of the day, in order to improve customer relations or provide more evenly distributed services.

In some instances, a client device or server may implement the latency injection techniques. In this way, the client or server device may calculate each transaction latency and record the calculated latencies in a pool of aggregated latencies for each given session or game. The client or server device may use the pool of latencies to keep track of the variations in latency and, in some instances, to track aggregate statistics such as a running average latency for the session, or for a predetermined amount of time. The client or server device may then select a latency for injection. The selection may be made from either, or any combination of, the pool of latencies, a running average or some other aggregate statistic, a threshold latency based on the pool, or a latency based on a user's, or operator's, instruction. Further, the client or server device may inject the selected latency for each subsequent transaction by delaying the rendering or serving of subsequent content, respectively, or buffering the content until the selected latency is achieved. Alternatively, the server device may inject the selected latency In yet other instances, a client device and a server device may work together to implement the latency injection techniques together. In this way, either the client device, the server device, or both devices may calculate transaction latencies. For example, the client device may calculate the transaction latencies by tracking the entire transaction from content request to content receipt. On the other hand, the server device may calculate the transaction latencies by tracking the entire transaction based on reported content request times and reported content receipt times. Additionally, the two devices may work together by communicating latency portions to construct a total transaction latency. Regardless of the implementation of latency calculation, the client device may inject a selected latency by delaying the rendering of received content, the server device may inject the selected latency by delaying the serving of the content or they may each delay the content. For instance, the client and the server may each delay the content according to the latencies experienced during respective transmissions to each device. That is, a request latency may be injected by the client device, while a service latency may be injected by the server device.

Still, in other instances, the techniques described herein may be implemented outside of the client-server environment altogether. For example, one or more processors on a single computing device may inject latency by delaying rendering of content to a user of the computing device. Similar to the client-server model described above, variations in latency may occur during reads and writes to local memory. As such, the processor may calculate, pool, and/or average the transaction latencies before selecting a latency with which to inject into the user experience. In one example, a processor that usually takes 100 milliseconds to display a drop-down menu may instill a 200 millisecond latency if the processor occasionally takes 200 milliseconds. This way, the user becomes accustomed to a consistent 200 millisecond delay and does not notice when the processor inadvertently hangs for 220 milliseconds. Peer-to-peer networks, IP and cellular telephony networks, interactive television devices, on-line auction Web sites, on-line poker Web sites, and multiple other environments may also practice the techniques described above.

The techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 illustrates an example architecture 100 in which a device 102 may receive and transmit digital content to a server 104 over a network 106. For instance, the device 102 may send a request 108 for content over the network 106 to the server 104. In one example, this device 102 may request 108 for the server 104 to send on-line game content to be rendered to a user. In another example, the device 102 may request 108 for the server to effectuate a game action or game component selection, such as firing a virtual weapon at an opponent or moving a virtual character. Additionally, in response to the request 108, the server 104 may serve 110 the requested content to the device 102. For example, if the device 102 requests 108 that a user's character jump onto a virtual block in the game environment, the server 104 may serve 110 the content that allows the device 102 to render the jumping action to the user.

Additionally, in some instances, the device 102 may send a location 112 of a game feature to the server 104. In this way, the server 104 may track the location 112 of the game feature when the user last acted. For example, to avoid issues with latency, it may be advantageous for the server 104 to know the location 112 of a game feature when the user perceived that they acted upon it. In other words, if a user fires a virtual weapon at an opponent in a first location 112, that location 112 may be reported to the server 104 in case, due to latency, the server 104 is unaware whether the user "hit" the intended target or not. This way, the server 104 may record that the user actually "hit" the target even though the server 104 perceived it as a "miss."

As discussed above, these network transactions, namely the request 108 and the service 110 of content, may involve some inherent, and even variable, latencies. For example, a slow network connection for either the device 102 or the server 104 may create latencies. Additionally, spikes in network congestion or even processor hangs may cause latencies. While this is generally unavoidable and expected among Internet users, variance within the latencies can lessen the user experience. In other words, users may find higher latencies that are constant more tolerable than variable latencies (even when the latency is low).

Thus, in some instances, the device 102 and/or the server 104 may calculate transaction latencies 114(1), 114(2), through 114(N) (represented in FIG. 1 by clocks), where N is an integer greater than zero. In this instance, each transaction latency 114(1) through 114(N) (collectively "calculated latencies 114") may represent an individually calculated latency 114 from individual transactions. By way of example, each individual transaction may represent a transaction between device 102 and server 104 for a single on-line session or game. The device 102 and/or the server 104 may perform the latency calculations 114 for each transaction that takes place during the session or game. As noted above, the device 102 may perform the latency calculations 114, the server 104 may perform the latency calculations 114 or the device 102 and the server 104 may perform the latency calculations 114 together. Also, as noted above, latency calculations 114 may be performed with respect to the request portion 108, the content service portion 110 or the entire transaction including both the request 108 and the serving 110 as signified by the two clocks in each latency calculation 114.

Additionally, the device 102 and/or the server 104 may be configured to create a latency pool 116 for aggregating each calculated latency 114. The latency pool 116 may contain each calculated latency 114 for the session or the game, or the latency pool 116 may only contain calculated latencies 114 for a specified time period that is shorter or longer than the on-line session or game. In some aspects, the latency pool 116 may contain the calculated latencies 114 as a ranked list (i.e., ranked from the highest latency to the lowest latency or vice versa), or as a form of aggregate statistic such as a running or exponential average for the entire session or game, or as a running or exponential average for some predetermined time period. For example, the device 102 and/or server 104 may continuously calculate a running average as each latency 114 is calculated and then store the running average in the latency pool.

The device 102 and/or server 104 may also be configured to select 118 a calculated latency 114 from the latency pool 116 to be injected in subsequent transactions. For example, the device 102 may select 118 a selected latency 120 from the latency pool 116 based on several factors. In one aspect, the device 102 may select the highest latency, the second or third highest latency, some other nth latency, an aggregate statistic such as a type of average or some other latency with which to inject into subsequent transactions. As shown in FIG. 1, and by way of example only, device 102 may inject selected latency 120 into subsequent transactions or server 104 may inject selected latency 120 into subsequent transactions. Additionally, both device 102 and server 104 may inject selected latency 120 into subsequent transactions together.

In this way, a calculated latency 114 that has been observed over network 106 may be selected 118 and injected to smooth out latency variance and improve the perceived performance of the system. As such, when the injected latency is at or near the highest calculated latency 114 for the system, occasional high latency spikes may go unnoticed. Further, by making the latency consistent across multiple or even all users, service providers and on-line game providers may be able to provide new types of games and services that have a leveled playing field. In other words, users with slower connections and/or slower computers may be more willing to participate on multi-user on-line games or activities.

While FIG. 1 illustrates each transaction with a single device 102 and a single server 104, the architecture 100 may implemented with multiple devices 102 and/or multiple servers 104. Additionally, while transactions are shown as a combination of request 108 and service of content 110, many other types of events or instructions may take place in a transaction over network 106. Additionally, while only one network 106 is shown in FIG. 1, any number of networks, whether public or private, can be used to implement example architecture 100.

Figure 2:
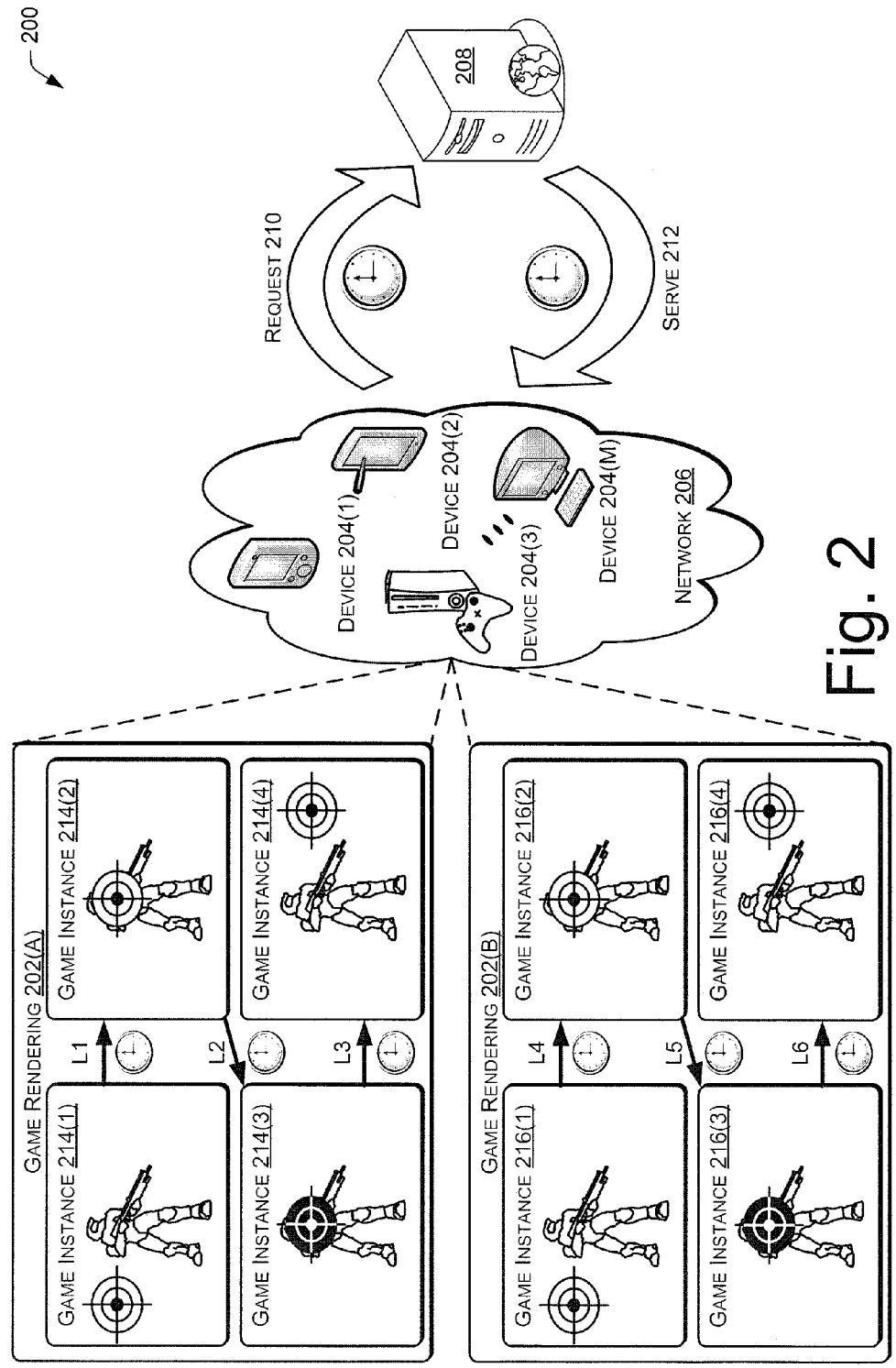
FIG. 2 illustrates two example transactions between at least one of a plurality of user devices and one or more servers. One example illustrates a network with variable latency, while the other example illustrates a network where latency injection may be used to achieve an improved user experience. In other examples, these transactions may be implemented by a peer-to-peer network without the use of a server.

FIG. 2 illustrates an example architecture 200 detailing two alternative on-line game renderings 202(A) and 202(B) for any number of a multitude of devices 204(1) through 204(M), where M is an integer greater than zero, interacting over a network 206 with a server 208. Devices 204(1) through 204 (M) (collectively "devices 204"), may include any type of digital device that can display graphical renderings to a user, such as, a personal computer, a handheld device, a game console, a smart phone, a laptop, etc. Additionally, similar to that discussed with reference to FIG. 1, devices 204 may send requests 208, or other instructions, to a server 208 and may receive content served 212 from the server 208 in response to the request 210. In particular, in one aspect, the content served 212 may be the game renderings 202(A) and/or 202(B).

Game renderings 202(A) and 202(B) are each examples of a game scene that may be played by a user of one or more of the devices 204. In both game rendering 202(A) and 202(B), the device 204 may render four scenes in sequential order. The game scene renders the user's actions of moving a crosshair from the left side of the screen 214(1) and 216(1) over a game character 214(2) and 216(2), shooting at the game character 214(3) and 216(3), and then moving the crosshair to the right side of the screen 214(4) and 216(4). Additionally, the latencies observed, or calculated, between game scenes are represented as L1 through L3 and L4 through L6, respectively. For example, the user may experience a latency of L1 time between activating an input device and seeing the crosshairs move from game instance 214(1) to 214(2), a latency of L2 time between activating the input device and seeing the crosshairs indicate a weapons fire from game instance 214(2) to 214(3), and a latency of L3 time between activating the input device and seeing the crosshairs move away from the game character from game instance 214(3) to 214(4).

In one instance, a device 204 and/or a server 208 may calculate latencies as described above. For example, with respect to FIG. 2, a device 204 may calculate the following latencies for the transactions related to game rendering 202 (A): L1=200 milliseconds, L2=245 milliseconds, and L3=150 milliseconds. By aggregating these calculated latencies in a pool, the device may select a latency for injection. In this example, the device 204 may select the highest latency of 245 milliseconds so that it may be less likely for later latencies to exceed this mark. In this case, the device 204 may delay the display of subsequent game renderings, such as game rendering 202(B), such that L4, L5 and L6 are each equal to 245 milliseconds. As discussed above, this can be done in several different ways, including but not limited to, delaying rendering for the difference of the current calculated latency and the selected latency or buffering the content to be rendered until 245 milliseconds have passed since the user's last interaction.

In another example, the device 204 may select the second highest latency for injection, in which case, game rendering 202(B) may set L4 through L6 to be equal to 200 milliseconds. Clearly, this will make game play faster and more responsive for the user; however, latency spikes at or above 245 milliseconds may be more noticeable and bothersome. In yet another example, the device 204 may calculate an aggregate statistic such as a running average, an exponential average, or some other type of average. In this case, the device 204 may select the running average as the injection latency or it may select an inflated or deflated running average. That is, the device 204 may determine that the running average is changing too frequently and not producing a constant latency for the user, in which case, the device 204 may inflate or deflate the running average by a certain percentage or by a predetermined constant amount and select this inflated or deflated running average as the injection latency. By way of example and not limitation, the inflated running average may be 125%, 150%, 175% or even 200% of the running average, or the inflated running average may be the running average plus 100 milliseconds, 200 milliseconds or even 300 milliseconds, based on current network conditions or the specific application for the which the latency injection is being used.

While FIG. 2 illustrates the sample transaction with a single server 208, the architecture 200 may be implemented with multiple servers 208. While the transactions is shown as a combination of request 210 and service of content 212, many other types of events or instructions may take place in a transaction over network 206. Additionally, while only one network 206 is shown in FIG. 2, any number of networks, whether public or private, can be used to implement example architecture 200. Further, any type of aggregate statistic may be used prior to selecting an injection latency and this disclosure shall not be limited to running and/or exponential averages.

Figure 3:
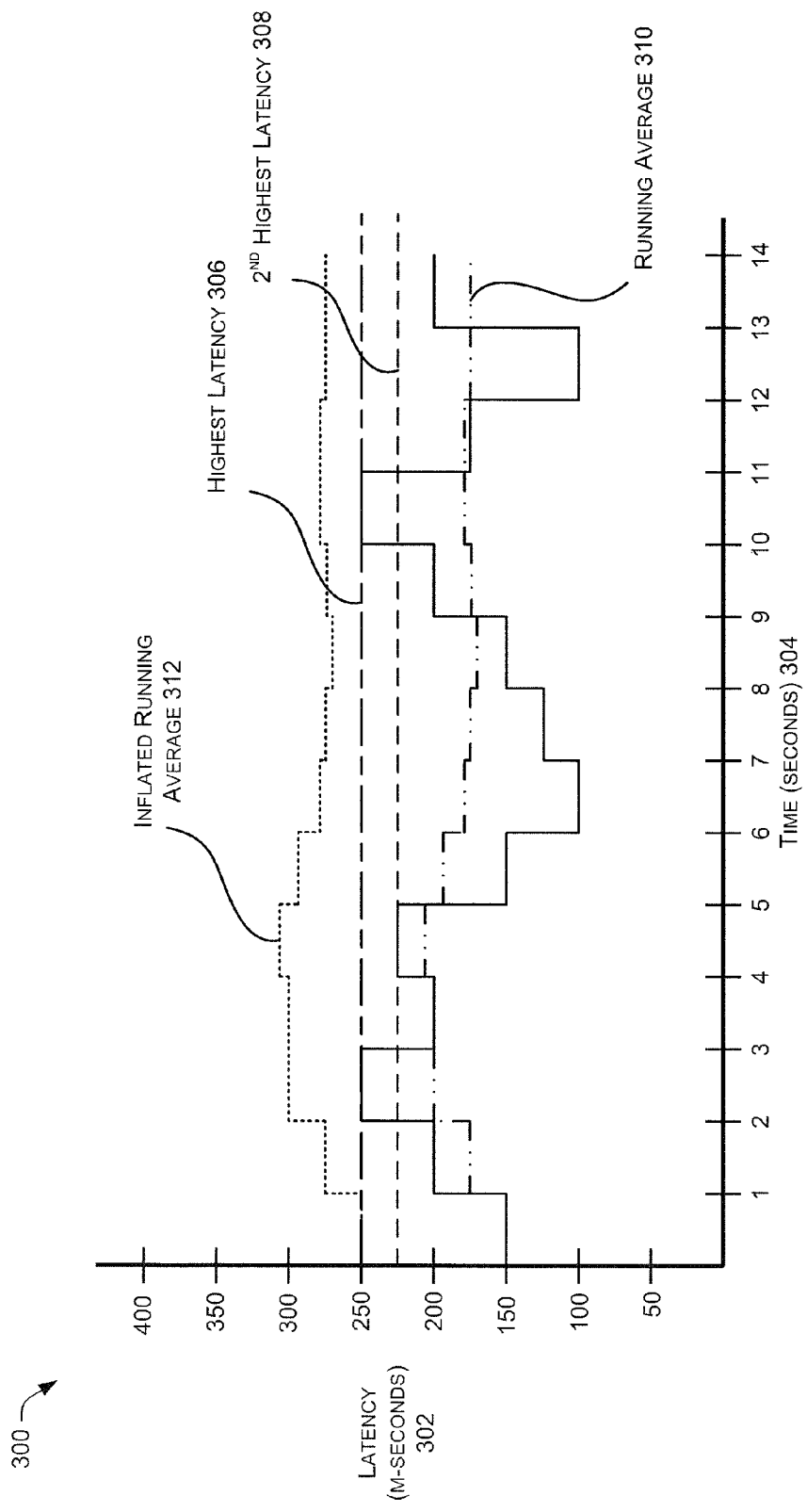
FIG. 3 represents an example square graph showing detected latency as a function of time. Specifically, this figure illustrates an example aggregate statistic and several latency thresholds that may be selected for injection.

FIG. 3 illustrates one possible square graph 300 representing calculated latencies 302 as a function of time 304 for a set of transactions as described above with reference to FIGS. 1 and 2. In this example, latencies are calculated in milliseconds and are recorded (i.e., stored in the pool) every second, represented by the solid line. As shown here, several sample selected latencies that a device and/or server may use for latency injection are shown. For example, a device and/or server may select the highest latency 306 or the second highest latency 308. Once selected, the device and/or server may be configured to inject the selected latency in one or more of the manners described above. For example, a device may delay the rendering of content or buffer the content to keep the perceived latency constant. It is important to note, however, that the highest latency, or any nth highest latencies selected, may change as more latencies are calculated. For example, while the highest latency 306 in FIG. 3 is shown as 250 milliseconds, that was not the highest latency until the time interval between seconds 2 and 3, and it may change if a latency above 250 milliseconds is calculated during a later transaction. Additionally, the same may be true for running average 310 which will change over time assuming that the calculated latencies vary. Additionally, as shown here, and as described briefly above, the device and/or server may select the inflated running average 312 for injection. As described above, the inflated running average 312 may be the running average 310 plus some constant.

While FIG. 3 illustrates one possible square graph 300 with calculated latencies 302 measured in milliseconds, any other type of graph may be used to represent the calculated latencies. Additionally, while time is measured in seconds in FIG. 3, any sampling time may be used for calculating latencies. Further, while a running average 310 and an inflated running average 312 are shown, any other type of aggregate statistic may be used to track the calculated latencies.

ILLUSTRATIVE ALTERNATIVE EMBODIMENTS

FIGS. 4A through 4D illustrate four different embodiments for implementing the latency injection architecture 100 described in FIGS. 1 and 2. However, while only four embodiments are shown here, additional embodiments are possible, some of which have been described above. In one aspect, and as described in detail regarding FIG. 1, latency injection may be implemented over a client-server network. Here, FIG. 4A illustrates one or more devices 402(1) through 402(K), where K is an integer greater than zero, in communication via a network with one or more servers 404(1) through 404(L), where L is an integer greater than zero. In this example, latencies 406 may be calculated, stored and selected for injection as described above.

In another aspect, a single device 408 may implement latency injection to improve the perceived performance of local processing 410. Here, FIG. 4B illustrates one or more processors 412(1) through 412(P), where P is an integer greater than zero, in communication with one or more local memory devices 414(1) through 414(Q), where Q is an integer greater than zero. In this example, latencies 416 may be calculated, stored and selected for injection as described above as well.

FIG. 4C illustrates a peer-to-peer network similar to the implementations described above, however, without any servers. In this example, a multitude of devices 418(1) through 418(S) may communicate with one another over a network. Latencies 420 may be calculated by one or all of the devices, collectively devices 418, for storing and selecting. In this example, each device 418 may control its own latency with respect to the other devices 418 and may calculate its own latencies 420 or may share information with each other to facilitate in the calculations of each other's latencies 420.

In another aspect, FIG. 4D illustrates a telephone system which may be implemented in a wired or wireless network. In this example, one or more telephone devices 422(1) through 422(X), where X is an integer greater than zero, may communicate over a cellular or other network with one or more cellular towers 424(1) through 424(Y), where Y is an integer greater than zero. As such, latencies 426 may be calculated and injected as described above to effectuate the perceived performance enhancements described herein. While FIG. 4D illustrates cellular telephone devices, collectively telephone devices 422, in communication with cellular towers, collectively cellular towers 424, other types of telephone systems may be used. For example, a wired or wireless IP telephony network or any other type of wireless network, such as 802.11 networks, may implement the latency injection methods described.

In yet another aspect, combinations of any of the aforementioned embodiments may be envisioned. For example, a telephone device 422 may be configured to implement the local processing type of latency injection 426 internally to create a constant delay before dialing a number. Additionally, the telephone device 422 may also be configured to inject latency into other internal processing transactions, and at the same time be configured to inject latency into networked transactions of FIG. 4D. In other words, the four embodiments illustrated in FIGS. 4A through 4D, and the other implementations described herein, are not intended to be mutually exclusive. Further, other combinations of either wired and/or wireless networks are possible as well. For examples scenarios may be envisioned where a computing device is communicating with other devices via a network made up of both wired and wireless connections.

Illustrative Computing Device

Figure 5:
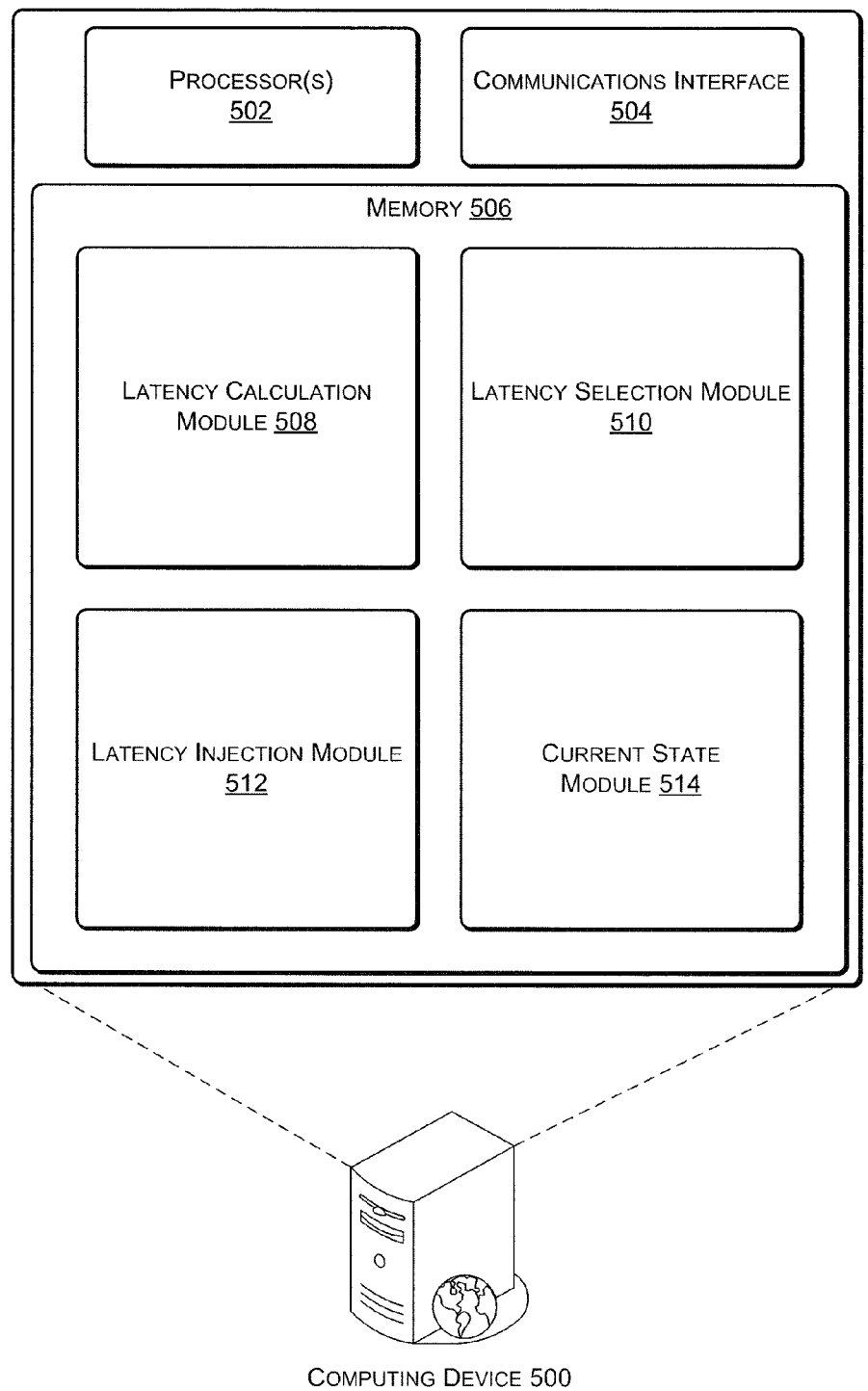
FIG. 5 illustrates an example computing device capable of implementing the techniques discussed above with reference to the architectures shown in FIGS. 1-4.

FIG. 5 illustrates an example computing device 500 that might be configured to implement the functions and features of latency injection, as described above. In a very basic configuration, the computing device 500 may include one or more processors 502, a communications interface 504 and memory 506. Depending on the configuration of the computing device 500, the memory 506 is an example of computer storage media and may include volatile and nonvolatile memory. Thus, the memory 506 may include, but is not limited to, RAM, ROM, EEPROM, flash memory, or other memory technology, or any other medium which can be used to store media items or applications and data which can be accessed by the computing device 500.

The memory 506 may be used to store any number of functional components that are executable on the processor(s) 502, as well as data and content items that are rendered by the computing device 500. Thus, the memory 506 may store an operating system and several modules containing logic.

A latency calculation module 508 located in memory 506 and executable on the processor(s) 502 may facilitate calculation of latency between devices over a network, or between local components of a device. The latency calculation module 508 may also be configured to calculate latencies based at least in part on content requests sent by one device and content received in response to the request. In one aspect, the latency calculation module 508 may be configured to operate a single device, while in other aspects it may span multiple devices in communication with one another. In other words, at least with respect to a client-server network, the latency calculations may be based on an amount of time between a content request and receipt determined by the client, an amount of time between content request and receipt determined by the server, or an amount of time between content request and receipt determined by the client and the server together.

The memory 506 may further store a latency selection module 510 to select an appropriate latency from an aggregated pool of calculated latencies. In one aspect, the latency calculation module 508 may be configured to store the calculated latencies in a pool of latencies for later selection by the latency selection module 510. In another aspect, however, the latency selection module 510 may be configured to perform the aggregation of calculated latencies. Additionally, the latency selection module 510 may be configured to select a running average of the aggregated latencies, a predetermined threshold based on the aggregated latencies, a predetermined $n^{th}$ highest latency of the aggregated latencies or any other latency that is based at least in part on the selected latencies.

The memory 506 may also store a latency injection module 512 to facilitate injecting latency into a system to improve the perceived performance. As discussed above, the latency injection module 512 may be responsible for delaying and/or buffering content at a client prior to rendering the content based on the latency selected by the latency selection module. Alternatively, the latency injection module 512 may be configured to delay or buffer serving content from a server based on the latency selection. In yet another aspect, the latency injection module 512 may facilitate cooperation between a client and a server to cooperatively delay or buffer the content such that the perceived performance is improved by making the latency consistent.

The computing device 500, in one configuration, may also include a current state module 514 stored in the memory 506 and executed on the processor(s) 502 responsible for recording and transmitting a current state of a system. In one aspect, the current state may include a location of a game feature that a user is intending to activate or move. In another aspect, however, the current state may represent a time within a game that the user perceives. In this way, the current state module 514 may report game feature locations and/or game times to other devices so that the devices may be synchronized. Additionally, by reporting a game feature location to an on-line game server, the computing device 500 can ensure that, regardless of latency, the game server will be notified if a user actually "hit" a target, even if the game server perceives a "miss."

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Illustrative Processes

Figure 6:
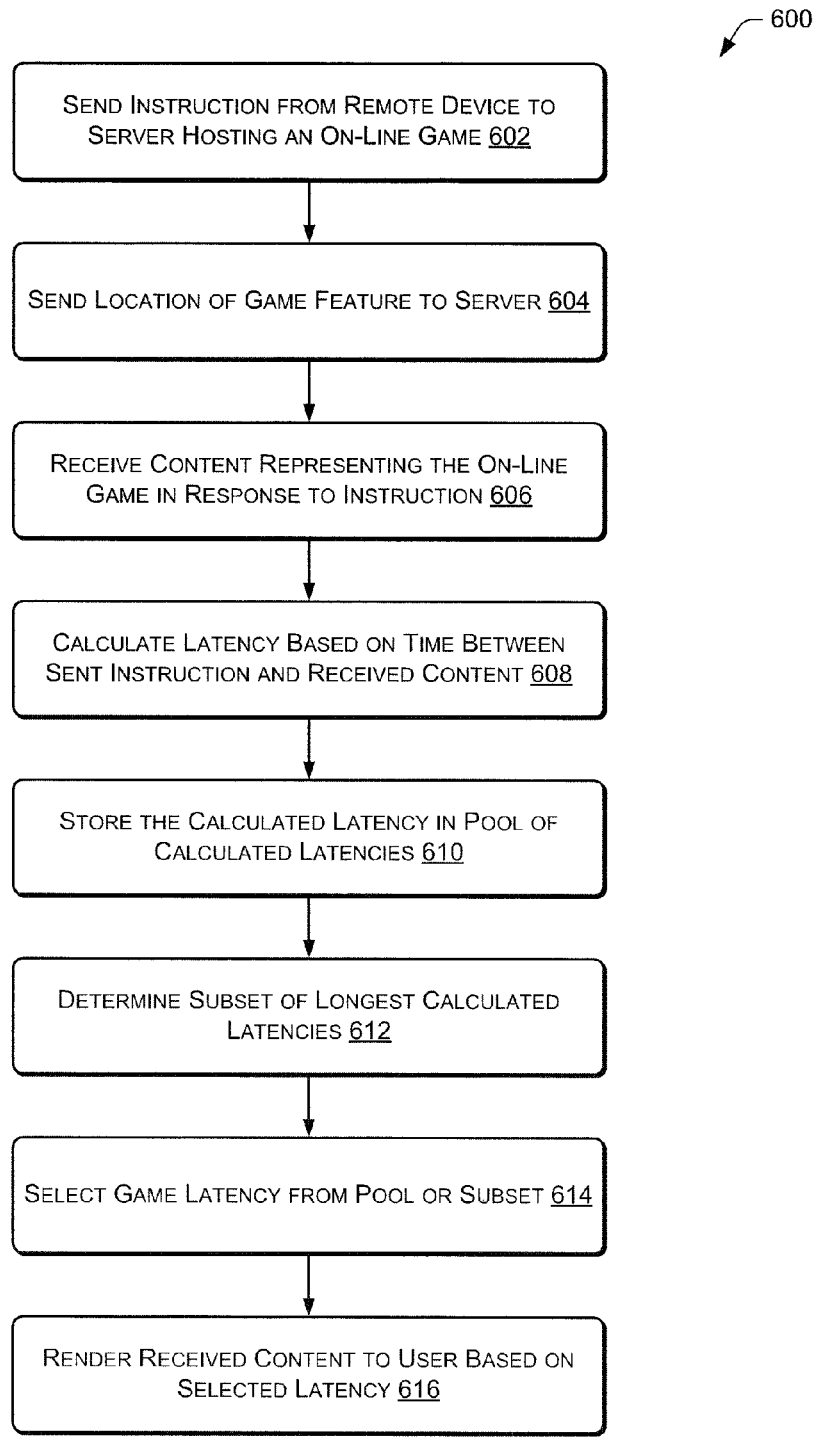
FIG. 6 illustrates an example flow diagram of a process for implementing latency injection. Here, a client device may send an instruction and a game feature location and, in response, may receive game content. A latency for the transaction may be calculated and stored in a pool, and the content may be rendered based on a selected latency from the pool.
Figure 7:
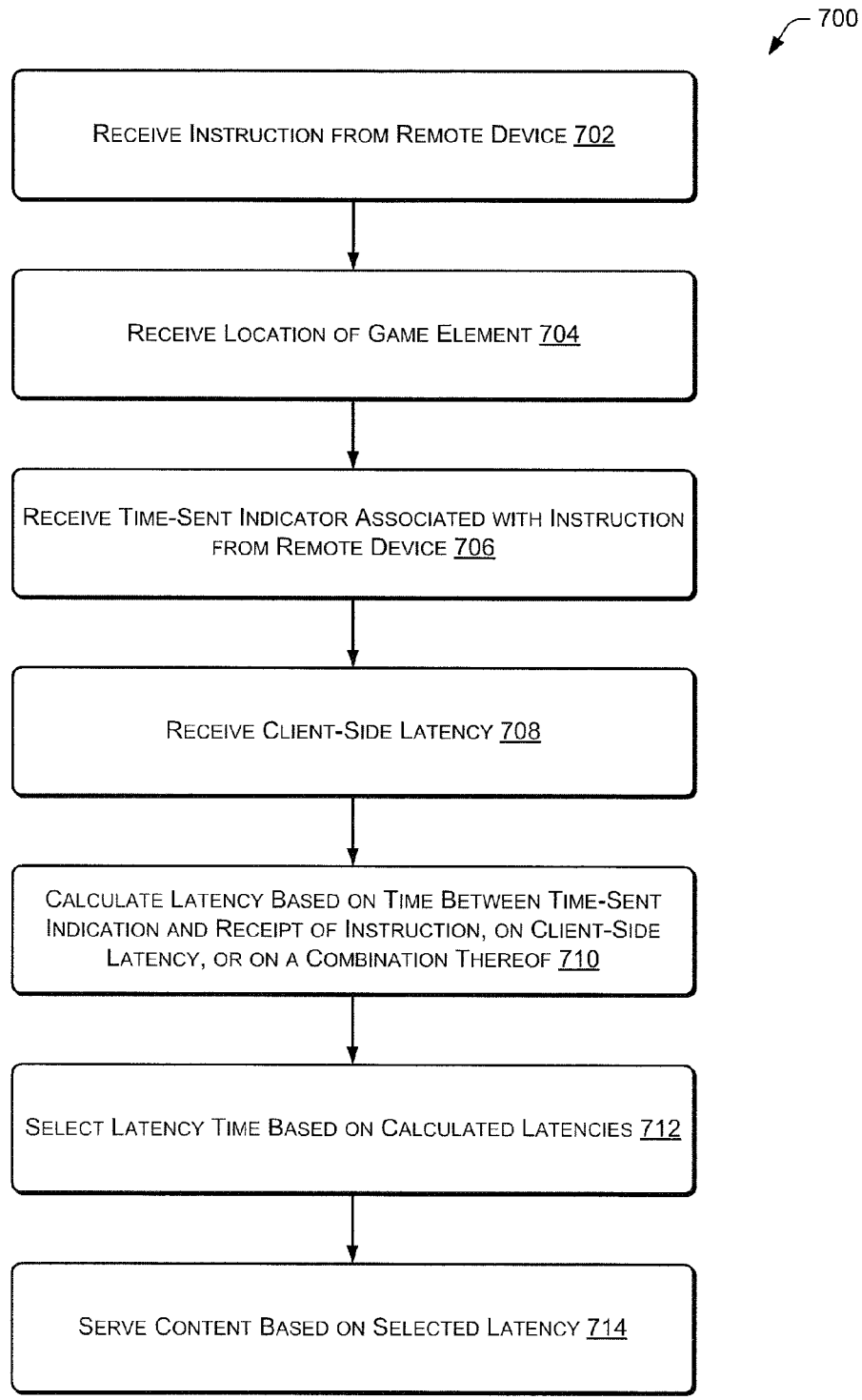
FIG. 7 illustrates an example flow diagram of another process for implementing latency injection. Here, a server, or peer device in a peer-to-peer network, may receive an instruction, a game feature location, a time-sent indicator and/or a client-side latency. The server may then calculate and select a latency time with which to serve the content.

FIGS. 6-7 are flow diagrams showing respective processes 600 and 700 for injecting latency to improve perceived computing device performance. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 6 illustrates an example flow diagram of process 600 for implementing a latency injection system that adds latency to improve the perceived performance of computing devices and networks, as discussed above.

The process 600 includes a remote device sending an instruction to a server hosting an on-line game at 602. At 604, the remote device may (optionally) send a location of a game feature to the server as well. In some instances, as noted above, the instruction sent to the server may be a request for content. At 606, the remote device receives content representing the on-line game to be rendered to a user in response to the instruction or the request. At 608, the remote device may calculate the latency of the transaction based on the time between sending the instruction or request and receiving the content from the server. In one instance, the remote device may calculate the latency based on information about the timing of sent content from the server.

At 610, the remote device may store the calculated latency in a pool of latencies. The pool of latencies may contain previously calculated latencies from the same game or on-line session. In one aspect, the remote device may determine a subset of the highest calculated latencies at 612. In other words, a few of the highest calculated latencies may be included in the subset. In another aspect, the remote device may calculate a running average or an inflated running average at 612. At 614, the remote device may select a game latency from the pool of calculated latencies or from the subset of highest latencies. In yet another aspect, the remote device may select the running average or the inflated running average. At 616, the remote device may render subsequent received content to a user based on the selected latency.

FIG. 7 illustrates an example flow diagram of process 700 for an alternative implementation of a latency injection system that adds latency to improve the perceived performance of computing devices and networks, as discussed above.

The process 700 includes receiving an instruction or a request for content from a remote device at 702. At 704, the process 700 may also (optionally) receive a location of a game element. At 706, the process 700 may receive a time-sent indicator associated with the instruction or request from the remote device. In one aspect, this time-sent indicator may be used to aid in calculating the transaction latency. At 708, the process 700 may (optionally) receive a client-side latency (i.e., a latency calculation made by the remote device).

At 710, the process 700 may calculate the latency of the given transaction based on the time between the time-sent indication and receipt of the instruction (i.e., the server-side latency). In another aspect, the process 700 may calculate the latency of the transaction based in part on the client-side latency at 710. In yet another aspect, at 710, the process 700 may calculate the latency of the given transaction based on a combination of the server-side latency and the client-side latency. At 712, the process 700 may select a game latency based on the calculated latency from 710. At 714, the process 700 may serve the requested content to the remote device based on the selected latency.

Additionally, while FIG. 6 generally describes a process from the perspective of a remote device and FIG. 7 generally describes a process from the perspective a server device, any combination of process 600 and process 700 may be possible. For example, a process may perform any combination of the operations listed above, including, but not limited to, all of the operations of the two processes 600 and 700 combined or merely a subset of the operations listed above.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   under control of one or more computer systems configured with executable instructions,
      sending an instruction to a server hosting a computer game;
      receiving, from the server responding to the instruction, content representing the computer game;
      calculating a latency based at least in part on an amount of time between the sending of the instruction to the server and the receipt of the content from the server;
      storing the calculated latency in a pool of calculated latencies;
      determining a game latency based at least in part on the pool of calculated latencies; and
      injecting the game latency into a transaction associated with rendering of the content received from the server.

2. The computer-implemented method of claim 1, wherein the instruction comprises an instruction to select or manipulate a game feature of the computer game.

3. The computer-implemented method of claim 2, further comprising sending to the server a location of the game feature, wherein the location is associated with the instruction.

4. The computer-implemented method of claim 1, wherein the injecting of the game latency comprises at least one of:
   delaying the rendering of the content until after an amount of time defined by the game latency;
   buffering the content for an amount of time defined by the game latency, before the rendering of the content;
   causing a delay, at the server, in providing subsequent content until after an amount of time defined by the game latency; or
   causing buffering, at the server, of the subsequent content for an amount of time defined by the game latency, before rendering the subsequent content.

5. The computer-implemented method of claim 1, wherein the determining of the game latency based at least in part on the pool of calculated latencies comprises determining an aggregate statistic of at least a subset of the pool of calculated latencies as the game latency.

6. A computer-implemented method comprising:
   under control of one or more computer systems configured with executable instructions,
      receiving an instruction from a remote device;
      receiving, from the remote device, a time-sent indicator indicating a time at which the remote device sent the instruction;
      calculating a latency based at least in part on an amount of time between the receiving of the instruction and the time indicated by the time-sent indicator;
      storing the calculated latency in a pool of calculated latencies;
      determining a first latency time based at least in part on the pool of calculated latencies; and
      injecting the first latency time into a transaction associated with providing computer game content to the remote device.

7. The computer-implemented method of claim 6 further comprising receiving a location of a user interface element associated with the instruction and the time-sent indicator.

8. The computer-implemented method of claim 6, wherein the injecting the first latency time comprises at least one of:
   causing a delay, at the remote device, in rendering of the computer game content until after an amount of time defined by the first latency time;
   causing buffering, at the remote device, of the computer game content for an amount of time defined by the first latency time, before the rendering of the computer game content;
   delaying the providing of the computer game content until after an amount of time defined by the first latency; or
   buffering the computer game content to be served for an amount of time defined by the first latency, before the providing of the computer game content.

9. The computer-implemented method of claim 6 further comprising:
   receiving a second latency time from the remote device, the second latency time being based at least in part on an amount of time between the remote device receiving the served content and a time indicated by an associated time-served indicator sent with the served content, and wherein the determining of the first latency time is based at least in part on the received second latency time.

10. One or more non-transitory computer-readable storage media storing computer-executable instructions that when executed by a processor perform operations comprising:
    sending a request for content to a server hosting one or more computer games;
    receiving, from the server responding to the request, content representing a computer game;
    calculating a latency based at least in part on an amount of time between the sending of the request to the server and the receiving of the content from the server;
    storing the calculated latency in a pool of calculated latencies;
    determining a game latency based at least in part on the pool of calculated latencies; and
    injecting the game latency into a transaction associated with rendering of the content received from the server.

11. The one or more non-transitory computer-readable storage media of claim 10, wherein the computer-executable instructions, when executed by the processor, further perform at least:
    sending a new request to the server for additional content;
    receiving, from the server, the additional content at least partly in response to the second request; and
    accessing the received additional content based at least in part on a a previously injected game latency.

12. The one or more non-transitory computer-readable storage media of claim 10, wherein the content is sent and received over a peer-to-peer network.

13. The one or more non-transitory computer-readable storage media of claim 10, wherein the content comprises game content requested by a client device from a game provider.

14. The one or more non-transitory computer-readable storage media of claim 13, wherein the computer-executable instructions, when executed by the processor, further perform:
sending a location of a game feature of a game, wherein the location is associated with the request for content.

15. The one or more non-transitory computer-readable storage media of claim 13, wherein the injection of the game latency is performed by the client device independent of other client devices and based at least in part on a first instruction from the game provider.

16. The one or more non-transitory computer-readable storage media of claim 14, wherein the client device determines a game latency substantially identical to one or more game latencies determined by other client devices interacting with the same game content based at least in part on a second instruction from the game provider received after the first instruction.

17. The one or more non-transitory computer-readable storage media of claim 13, wherein the determining of the game latency is performed by the client device and comprises determining the game latency that is substantially identical to one or more game latencies determined by other client devices based at least in part on an instruction from the game provider.

18. The one or more non-transitory computer-readable storage media of claim 10, wherein the content comprises data stored in a local memory, the request is sent to the local memory, and the content is received at a local processor.

19. A system comprising:
a data store configured to at least store computer-executable instructions; and
a computing device in communication with the data store, the computing device implementing the computer-executable instructions to at least:
send a request for content to a server hosting one or more computer games;
receive, from the server, content representing a computer game;
calculate a latency based at least in part on an amount of time between the request for content and the receipt of the content;
store the calculated latency in a pool of calculated latencies;
determine a game latency based at least in part on the pool of calculated latencies; and
inject the game injection latency into a transaction associated with rendering of the content received from the server.

20. The system of claim 19, wherein the amount of time between the request for content and the receipt of the content is determined by at least one of a requestor or the server.

21. The system of claim 19, wherein the computing device further implements the computer-executable instructions to at least determine the game latency based at least in part on:
aggregating calculated latencies over a session; and
determining an aggregate statistic of the aggregated latencies for injection or selecting a predetermined nth highest latency time from the aggregated latencies for injection, where n is an integer greater than zero.

22. The system of claim 19, wherein the computing device further implements the computer-executable instructions to at least inject the game latency by at least one of:
delaying rendering of the content until after an amount of time defined by the determined game latency;
buffering the content for an amount of time defined by the determined game latency, before the rendering of the content;
buffering the content to be served for an amount of time defined by the determined game latency, before providing the content to a requestor; or
delaying the serving of the content to the requestor until after an amount of time defined by the determined game latency.

23. The system of claim 19, wherein the computing device further implements the computer-executable instructions to at least:
determine a current state of the system; and
send at least one of the current state or the content request to a holder of the content, wherein the current state is associated with the content request.

24. The system of claim 23, wherein the current state represents at least one of a location of a game feature in a game or a time of the game.

* * * * *

UNITED STATES PATENT AND TRADEMARK OFFICE
CERTIFICATE OF CORRECTION

| | |
|---|---|
| PATENT NO. | : 9,131,025 B1 |
| APPLICATION NO. | : 14/099819 |
| DATED | : September 8, 2015 |
| INVENTOR(S) | : Ethan Z. Evans et al. |

It is certified that error appears in the above-identified patent and that said Letters Patent is hereby corrected as shown below:

In the specification

In column 1 at line 12 (approx.), Change "ACCOMODATING" to --ACCOMMODATING--.

In column 3 at line 22, Change "latency" to --latency.--.

In the claims

In column 12 at line 64, In Claim 11, after "on a" delete "a".

Signed and Sealed this
Ninth Day of August, 2016

Michelle K. Lee
*Director of the United States Patent and Trademark Office*